C. H. MYERS.
WORM GEARING.
APPLICATION FILED MAR. 1, 1912.

1,060,933.

Patented May 6, 1913.

WITNESSES
Jas. K. McCathran
F. T. Chapman

Charles H. Myers, INVENTOR
BY
ATTORNEY

UNITED STATES PATENT OFFICE.

CHARLES H. MYERS, OF BUFFALO, NEW YORK.

WORM-GEARING.

1,060,933.

Specification of Letters Patent.

Patented May 6, 1913.

Application filed March 1, 1912. Serial No. 680,784.

*To all whom it may concern:*

Be it known that I, CHARLES H. MYERS, a citizen of the United States, residing at Buffalo, in the county of Erie and State of New York, have invented a new and useful Worm-Gearing, of which the following is a specification.

This invention has reference to improvements in worm gearing, and its object is to provide a worm gearing wherein the friction between the two members of the gearing is reduced to a minimum by the employment of anti-friction devices, which are so constructed as to be in most part made up of stock materials.

The invention comprises a worm which may be similar to the worms customarily in use, while the worm gear wheel constituting the driven member of the gearing is provided with members which because of the similarity of function with the teeth of the ordinary worm gear wheel may also be termed teeth, and these members are so constructed as to present rounded surfaces at all times to the helical flange of the worm and whenever the flange of the worm or drive member engages the teeth of the worm gear wheel a rolling contact is obtained, so that at no point is there sliding contact, wherefore the friction usually caused by sliding contact is avoided.

To carry out the invention the teeth of the worm gear wheel are each made up of one or more balls or spheres through which there is produced a diametric passage countersunk at the ends to receive a machine screw of commercial form and confined anti-friction balls, also of commercial form, the spheres, screws, and balls being obtainable in the open market, and the only work necessary on the spheres being to bore and counterbore them. The gear wheel is provided with a rim laterally curved to form a peripheral channel, and one or more peripheral rows of spheres are mounted in said peripheral channel to be engaged by the helical flange of the worm.

The invention will be best understood from a consideration of the following detailed description, taken in connection with the accompanying drawings forming a part of this specification, with the understanding that while the drawings show a practical form of the invention it is susceptible of various changes and modifications so long as such changes and modifications do not mark any material departure from the salient features of the invention.

Figure 1:
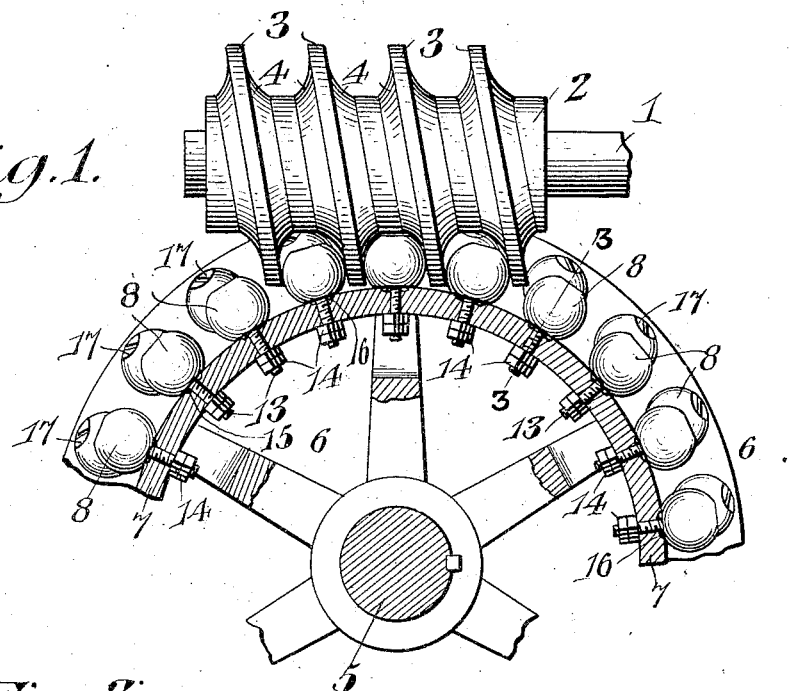
Figure 2:
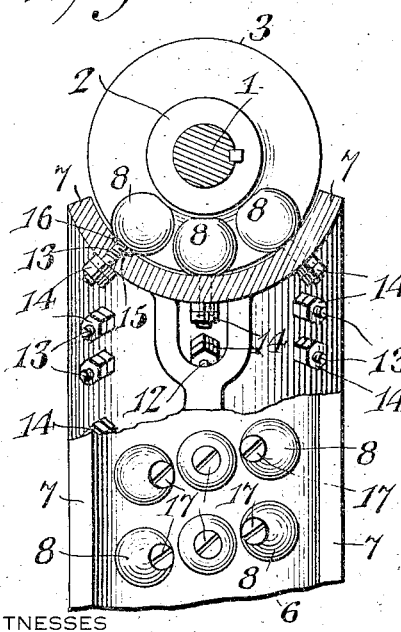
Figure 3:
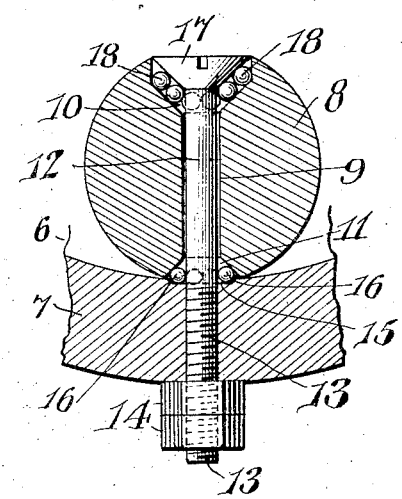

In the drawings:—Figure 1 is a section through the worm gear wheel in a plane at right angles to the axis thereof and showing the worm and other parts in elevation. Fig. 2 is an elevation of a fragment of the worm gear wheel showing the rim at one point in cross section and also showing the driving worm in end elevation with its drive shaft in cross section. Fig. 3 is a section on the line 3—3 of Fig. 1 omitting all but one of the spheres carried by the worm gear wheel and drawn to a larger scale than the other figures.

Referring to the drawings there is shown a drive shaft 1 upon which is mounted a worm 2 provided with a helical flange 3 of suitable radial extent and pitch, the flange 3 having its side walls 4 slightly rounded or hollowed.

Mounted on a driven shaft 5 is a wheel 6 having a rim 7 curved laterally or in the direction of the longitudinal axis of the shaft 5 to form a rounded periphery or rim of channel shape. The rim 7 carries on its outer channel face circular series of spheres 8, each of which has diametrically through it a passage 9, one end of which is countersunk, as indicated at 10, and the other end of which is countersunk, as indicated at 11, the countersink 10 being usually somewhat deeper than the countersink 11.

Traversing the passage 9 is the smooth shank of a machine screw 12 having a threaded end 13 extending through a tapped passage through the rim 7 perpendicular to the part of the rim 7 traversed by the threaded passage. The threaded portion 13 of the screw 12 is long enough to extend beyond the inner face of the rim 7 where it receives lock nuts 14. About each threaded passage for the end 13 of a screw 12 the outer face of the rim 7 is countersunk, as indicated at 15, to receive a series of anti-friction balls 16 confined to the countersink 15 by the countersunk portion 11 of the sphere 8.

The screw 12 is provided with a suitable head 17 adapted to the countersink 10 and confining anti-friction balls 18 therein.

Since the spheres 8 are obtainable in the open market and need be only bored and counterbored, and since the screws 12 and anti-friction balls employed are obtainable in the open market, the cost of the gearing is quite moderate, for the parts are readily assembled. The screw 12 provides means whereby the spheres 8 may be delicately adjusted to turn freely yet snugly on the screws 12 as spindles, and when the proper degree of adjustment is obtained the screws 12 may be locked against longitudinal movement by the nuts 14. The screws 12 also provide ready means for adjustments for wear which can be made with the greatest facility, while the materials from which the commercially obtainable parts are made are amply resistant to the strains put upon them for the purposes of the present invention.

By curving the rim 7, two, three or more peripheral rows of spheres 8 may be mounted on the driven wheel and a correspondingly powerful worm gearing is thereby feasible and even though the power transmitted be great the friction encountered is comparatively slight with respect to the worm gearing where the helical flange of the worm bears against teeth elongated laterally of the worm gear and therefore presenting long friction surfaces for engagement. The power transmitted by worm gearing is usually great and the friction produced is correspondingly great, while with the present invention an equal extent of teeth on the driving wheel is obtained, and at the same time the friction is reduced to a minimum and far below that of teeth integral with the rim of the driven wheel.

Anti-friction worm gearing as heretofore constructed has been of a complicated nature requiring practically all the parts to be of special make without corresponding advantages, while with the present invention the anti-friction members are obtainable in the open market and require but a minimum of change to adapt them to the purposes of the present invention.

The screws 12 are obtainable in various thicknesses and therefore may be chosen in accordance with the power to be transmitted, so as to withstand side strains without liability of bending, while the spheres 8 may have the bores 9 of considerable diameter in proportion to the diameter of the spheres to accommodate thick screws 12, whereby the strength of the worm gear wheel is correspondingly enhanced.

What is claimed is:—

1. A worm gearing comprising a worm and a worm gear wheel, the latter being provided with teeth composed of spheres bored diametrically with a counter-bore at each end of the diametric bore, a screw traversing the bore of each sphere and carried by the gear wheel, and anti-friction balls lodged in the counter-bores at the ends of the main bore of the sphere.

2. A worm gearing comprising a worm and a worm gear wheel having a peripheral series of spheres mounted thereon, each sphere having a diametric bore therethrough with counter-bores at the opposite ends, and a screw having a head adapted to one counter-bore in the sphere and a smooth portion traversing the main bore of the sphere, said screw having a threaded portion, and the gear wheel having a rim with a tapped passage therethrough for said threaded portion of the screw and also a counter-bore about said tapped passage, and anti-friction balls lodged in the counter-bores of the sphere and in the corresponding counter-bore in the rim of the gear wheel, the threaded portion of the screw being of a length to extend through the rim and beyond that face of the rim remote from the counterbore and there provided with lock nuts.

3. A worm gear comprising a worm having a helical flange with hollowed side walls and a gear wheel with a laterally curved periphery forming a circumferential channel about the gear wheel, and series of spheres carried by the rim of the gear wheel within the channel, each sphere having a diametric bore with counter-bores at opposite ends, the counter-bore at one end being larger than that at the other, a screw traversing each sphere and provided with a head at one end adapted to the larger counter-bore, a smooth shank adapted to the main bore of the sphere, and a threaded end for engaging and traversing the rim of the gear wheel, the said rim where traversed by the screw being counter-bored to match the corresponding counter-bore in the sphere, and anti-friction balls lodged in the counter-bores of the sphere, being confined therein at one end by the head of the screw and at the other end by coacting parts of the sphere and rim of the gear wheel, said screw having the threaded end of a length to extend through and beyond the rim of the wheel and there provided with lock nuts.

In testimony that I claim the foregoing as my own, I have hereto affixed my signature in the presence of two witnesses.

CHAS. H. MYERS.

Witnesses:
 JOHN H. SIGGERS,
 DAVID R. WAGNER.